United States Patent
Keohane et al.

(10) Patent No.: US 9,497,165 B2
(45) Date of Patent: *Nov. 15, 2016

(54) VIRTUAL FIREWALL LOAD BALANCER

(71) Applicant: International Business Machines Corporation, Armonk, NY (US)

(72) Inventors: Susann M. Keohane, Austin, TX (US); Gerald F. McBrearty, Austin, TX (US); Shawn P. Mullen, Buda, TX (US); Jessica C. Murillo, Round Rock, TX (US); Johnny M. Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/669,277

(22) Filed: Mar. 26, 2015

(65) Prior Publication Data

US 2016/0285828 A1 Sep. 29, 2016

(51) Int. Cl.
*H04L 29/06* (2006.01)

(52) U.S. Cl.
CPC ....... *H04L 63/0245* (2013.01); *H04L 63/0263* (2013.01)

(58) Field of Classification Search
CPC ............. H04L 63/00; H04L 63/02; H04L 63/0209–63/0236; H04L 63/0263; H04L 63/029; H04L 63/14; H04L 63/1408; H04L 63/1441; H04L 63/1466; H04L 63/16; H04L 63/166; H04L 63/18; H04L 63/306; G06F 9/45533; G06F 2009/45587; G06F 2009/45595

See application file for complete search history.

(56) References Cited

U.S. PATENT DOCUMENTS

| | | | |
|---|---|---|---|
| 7,937,438 B1* | 5/2011 | Miller | H04L 41/12 370/397 |
| 8,199,754 B2 | 6/2012 | Smith et al. | |
| 8,230,505 B1* | 7/2012 | Ahrens | G06Q 10/02 705/5 |
| 8,295,198 B2* | 10/2012 | Newman | H04L 43/18 370/253 |
| 8,621,627 B1* | 12/2013 | Eiriksson | H04L 63/0236 709/250 |
| 8,667,588 B2* | 3/2014 | Stolfo | H04L 63/1408 726/23 |
| 8,904,511 B1* | 12/2014 | O'Neill | H04L 63/0263 709/223 |

(Continued)

OTHER PUBLICATIONS

IBM, "List of IBM Patents or Patent Applications Treated as Related (Appendix P)," Jun. 12, 2015, p. 1-2.

(Continued)

*Primary Examiner* — Eric W Shepperd
(74) *Attorney, Agent, or Firm* — Robert C. Bunker (57) ABSTRACT

According to one exemplary embodiment, a method for load balancing between a virtual component within a virtual environment and a Host Intrusion Prevention System (HIPS) is provided. The method may include receiving a trusted connection table from the HIPS, wherein the trusted connection table contains a plurality of trusted connection information. The method may also include receiving a network packet from a virtual switch, wherein the network packet has a plurality of connection information. The method may then include determining if the plurality of connection information matches the plurality of trusted connection information. The method may further include sending the network packet to a destination based on determining that the plurality of connection information matches the plurality of trusted connection information. The method may include sending the network packet to the HIPS based on determining that the plurality of connection information does not match the plurality of trusted connection information.

11 Claims, 6 Drawing Sheets

(56) References Cited

U.S. PATENT DOCUMENTS

| | | | |
|---|---|---|---|
| 9,264,402 B2* | 2/2016 | Anderson | H04L 63/1441 |
| 2002/0069369 A1* | 6/2002 | Tremain | H04L 63/0209 726/14 |
| 2003/0004688 A1* | 1/2003 | Gupta | G06F 21/55 702/188 |
| 2005/0257256 A1 | 11/2005 | Supnik et al. | |
| 2006/0143699 A1* | 6/2006 | Nagata | H04L 63/0227 726/11 |
| 2008/0028445 A1* | 1/2008 | Dubuc | H04L 63/08 726/5 |
| 2010/0306847 A1* | 12/2010 | Lambert | G06F 21/552 726/24 |
| 2011/0004935 A1* | 1/2011 | Moffie | G06F 21/53 726/23 |
| 2011/0173699 A1* | 7/2011 | Figlin | H04L 63/1408 726/23 |
| 2012/0210417 A1* | 8/2012 | Shieh | H04L 67/00 726/12 |
| 2014/0146705 A1* | 5/2014 | Luxenberg | H04L 45/64 370/254 |
| 2014/0164619 A1* | 6/2014 | Zhu | G06F 9/45558 709/226 |
| 2014/0280836 A1 | 9/2014 | Kumar et al. | |
| 2014/0317737 A1* | 10/2014 | Shin | H04L 63/1408 726/23 |
| 2014/0331274 A1* | 11/2014 | Bitton | H04L 63/0227 726/1 |
| 2015/0096007 A1* | 4/2015 | Sengupta | H04L 63/0218 726/11 |
| 2015/0222647 A1* | 8/2015 | Lietz | H04L 63/1416 726/23 |

OTHER PUBLICATIONS

Keohane et al., "Virtual Firewall Load Balancer," filed Jun. 11, 2015, p. 1-29, U.S. Appl. No. 14/737,334.

Mell et al., "The NIST Definition of Cloud Computing," National Institute of Standards and Technology, Information Technology Laboratory, Oct. 7, 2009, Version 15.

Tsyrklevich, "Attacking Host Intrusion Prevention Systems," Black Hat USA Presentation, 2004, Security Architects.

Wikipedia, "Virtual firewall," Wikipedia: the free encyclopedia, Last Modified on Nov. 11, 2014, p. 1-6, http://en.wikipedia.org/wik/Virtual_firewall, Accessed on: Jan. 9, 2015.

* cited by examiner

VIRTUAL FIREWALL LOAD BALANCER

BACKGROUND

The present invention relates generally to the field of computing, and more particularly to firewalls.

Firewalls are used extensively in networked environments to control incoming and outgoing network traffic to protect in internal network from potentially insecure outside networks. Depending on the amount of network traffic being processed by the firewall, network transmission performance may drop.

SUMMARY

According to one exemplary embodiment, a method for load balancing between a virtual component within a virtual environment and a Host Intrusion Prevention System (HIPS) is provided. The method may include receiving a trusted connection table from the HIPS, wherein the trusted connection table contains a plurality of trusted connection information. The method may also include receiving a network packet from a virtual switch, wherein the network packet has a plurality of connection information. The method may then include determining if the plurality of connection information matches the plurality of trusted connection information. The method may further include sending the network packet to a destination based on determining that the plurality of connection information matches the plurality of trusted connection information. The method may include sending the network packet to the HIPS based on determining that the plurality of connection information does not match the plurality of trusted connection information.

According to another exemplary embodiment, a computer system for load balancing between a virtual component within a virtual environment and a Host Intrusion Prevention System (HIPS) is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving a trusted connection table from the HIPS, wherein the trusted connection table contains a plurality of trusted connection information. The method may also include receiving a network packet from a virtual switch, wherein the network packet has a plurality of connection information. The method may then include determining if the plurality of connection information matches the plurality of trusted connection information. The method may further include sending the network packet to a destination based on determining that the plurality of connection information matches the plurality of trusted connection information. The method may include sending the network packet to the HIPS based on determining that the plurality of connection information does not match the plurality of trusted connection information.

According to yet another exemplary embodiment, a computer program product for load balancing between a virtual component within a virtual environment and a Host Intrusion Prevention System (HIPS) is provided. The computer program product may include one or more computer-readable storage devices and program instructions stored on at least one of the one or more tangible storage devices, the program instructions executable by a processor. The computer program product may include program instructions to receive a trusted connection table from the HIPS, wherein the trusted connection table contains a plurality of trusted connection information. The computer program product may also include program instructions to receive a network packet from a virtual switch, wherein the network packet has a plurality of connection information. The computer program product may then include program instructions to determine if the plurality of connection information matches the plurality of trusted connection information. The computer program product may further include program instructions to send the network packet to a destination based on determining that the plurality of connection information matches the plurality of trusted connection information. The computer program product may include program instructions to send the network packet to the HIPS based on determining that the plurality of connection information does not match the plurality of trusted connection information.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for virtual firewall load balancing. Therefore, the present embodiment has the capacity to improve the technical field of firewall load handling by splitting the Host Intrusion Prevention Systems (HIPS) inspection engine and the bypass mechanism and running the bypass mechanism within a virtual environment. More specifically, by performing firewall bypass functions within the virtual environment performance may improve as packet communications between logical partitions may remain within the virtual environment instead of sending packets out to an external firewall and back to the virtual environment.

As described above, firewalls are employed to control incoming and outgoing network traffic. For most network attached firewalls, if the load (i.e., the amount of network traffic being processed by the firewall) becomes large enough and hits a performance threshold value, then the firewall allows excess traffic to bypass the firewall rules and pass through the firewall without reviewing the bypassed traffic. However, while the performance threshold may be changed or removed the network endpoint's TCP/IP may start timing out and retransmitting that may lead to network storms and network outages.

Modern firewalls or Host Intrusion Prevention Systems (HIPS) often perform deep packet inspections. Deep packet inspections include looking at the packet header (TCP/IP) information and the examining the packet's payload (i.e., data carried by the packet). Additionally, exhaustive virus scans may be performed on the payload. When a connection becomes well established and trusted. Deep packet inspections may therefore have a significant performance impact. Due to the expense involved in performing deep packet inspections, once a connection is considered trusted, the connection is put on a bypass list and all traffic relating to that connection may flow without any further inspection to improve performance.

In a system having multiple logical partitions (LPARs) and a virtual input output server (VIOS) connected by virtual local area network (VLAN) connections, LPAR traffic destined for a neighboring LPAR may travel to the VIOS before travelling to a physical network interface controller (NIC) and then to the firewall physically outside of the system over a network connection only to return from the firewall back over the same network connection to the same physical system hosting the neighboring LPAR. Sending LPAR traffic physically outside to a firewall and then back significantly impacts performance without providing security benefits.

Thus, virtualized networking and external firewalls may not be coordinated properly to avoid negative performance impacts since administrators of external networks may not have knowledge of the virtual system (e.g., LPARs, VLANs, VIOS instances, etc.). Firewall functionality may be brought inside the virtual system; however the firewall analysis may be computationally expensive for general purpose hardware to execute. Firewall analysis may be more efficiently handled by specialized integrated circuits (ICs) found in network attached firewalls.

Therefore, it may be advantageous to, among other things, provide a way to coordinate the bypass rules into the virtual system and keep most of the firewall functionality outside the virtual system.

According to at least one embodiment, the HIPS inspection engine may be split from the bypass mechanism. The bypass method may be self-contained or coordinated within the virtual system while the HIPS engine may remain outside the virtual system connected to the physical network. The firewall bypass mechanism may be implemented as VLAN hop routes by directing traffic loads or allow trusted Simple Network Management Protocol version 3 (SNMPv3) traps from IBM Tivoli Proventia, or Netcool, or other network attached HIPS. The SNMPv3 traps or other trusted messages from the physical HIPS system may describe the bypass need and specific bypass rules. A user may be allowed to configure bypass rules within the VIOS to provide a way for trusted connections (e.g., Secure Shell (SSH), Secure Socket Layer (SSL), etc.) to hop between VLANs and remain within the physical system without draining external network resources. The bypass rules and algorithms may then be implemented locally within the virtual system using a virtual component (e.g., PowerSC™) that may be placed in the virtual network layer. The virtual component may dynamically apply bypass rules based on the algorithms commonly used in a physical HIPS system. The virtual component may also receive SNMPv3, Network Configuration Protocol (NETCONF), or other trusted messages from the physical HIPS system to implement bypass rules on the behalf of the physical HIPS system.

Figure 1:
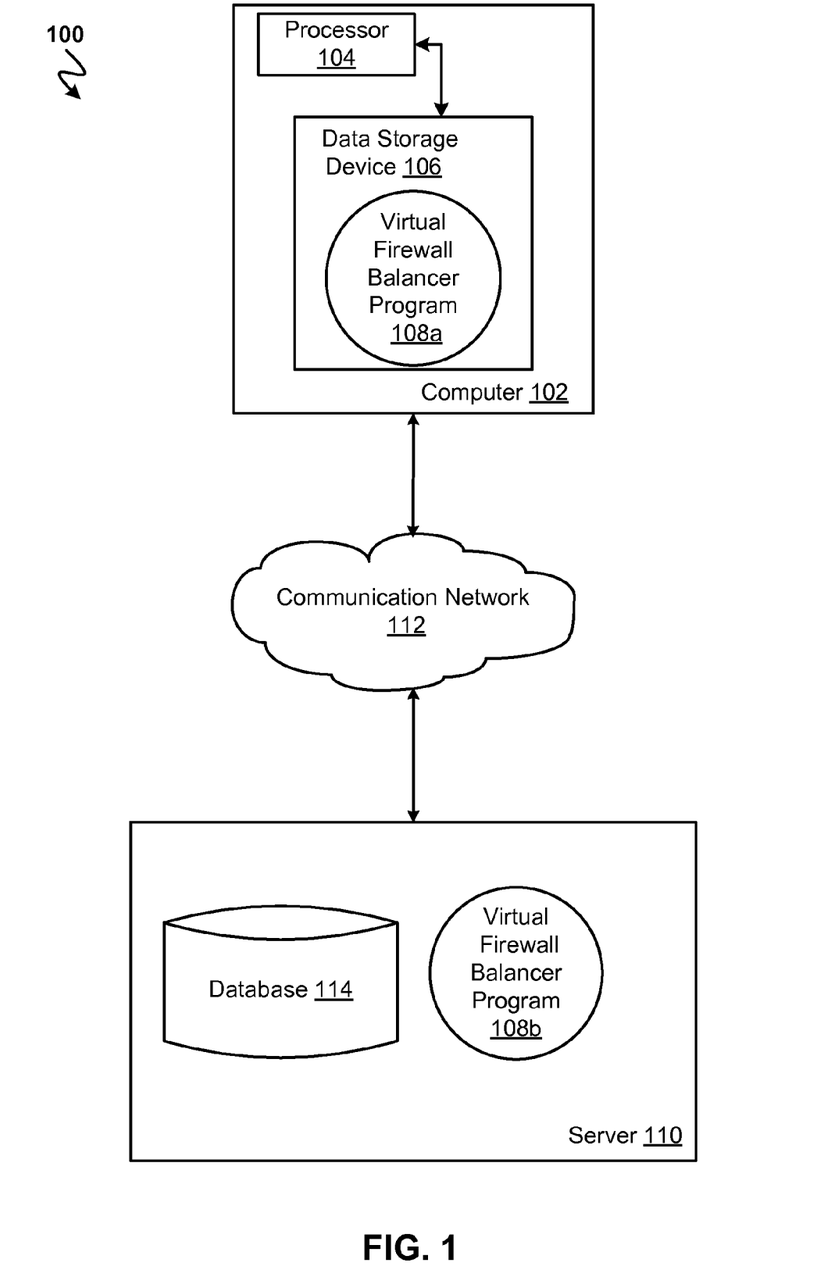
FIG. 1 illustrates a networked computer environment according to at least one embodiment.

Referring now to FIG. 1, an exemplary networked computer environment 100 in accordance with one embodiment is depicted. The networked computer environment 100 may include a computer 102 with a processor 104 and a data storage device 106 that is enabled to run a virtual firewall balancer program 108a. The networked computer environment 100 may also include a server 110 that is enabled to run a virtual firewall balancer program 108b and a communication network 112. The networked computer environment 100 may include a plurality of computers 102 and servers 110, only one of which is shown for illustrative brevity. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 110 via the communications network 112. The communications network 112 may include connections, such as wire, wireless communication links, or fiber optic cables. As will be discussed with reference to FIG. 4, server computer 110 may include internal components 902a and external components 904a, respectively and client computer 102 may include internal components 902b and external components 904b, respectively. Client computer 102 may be, for example, a mobile device, a telephone, a PDA, a netbook, a laptop computer, a tablet computer, a desktop computer, or any type of computing device capable of running a program and accessing a network. According to various implementations of the present embodiment, the virtual firewall balancer program 108a and 108b may interact with a database 114 that may be embedded in various storage devices, such as, but not limited to a computer/mobile device 102, a networked server 110, or a cloud storage service.

A program, such as a virtual firewall balancer program 108a and 108b may run on the client computer 102 or on the server computer 110. The virtual firewall balancer program 108a and 108b may be used to dynamically apply bypass rules in a virtual network layer in a virtual system. The virtual firewall balancer program 108a and 108b is explained in further detail below with respect to FIG. 3.

Figure 2:
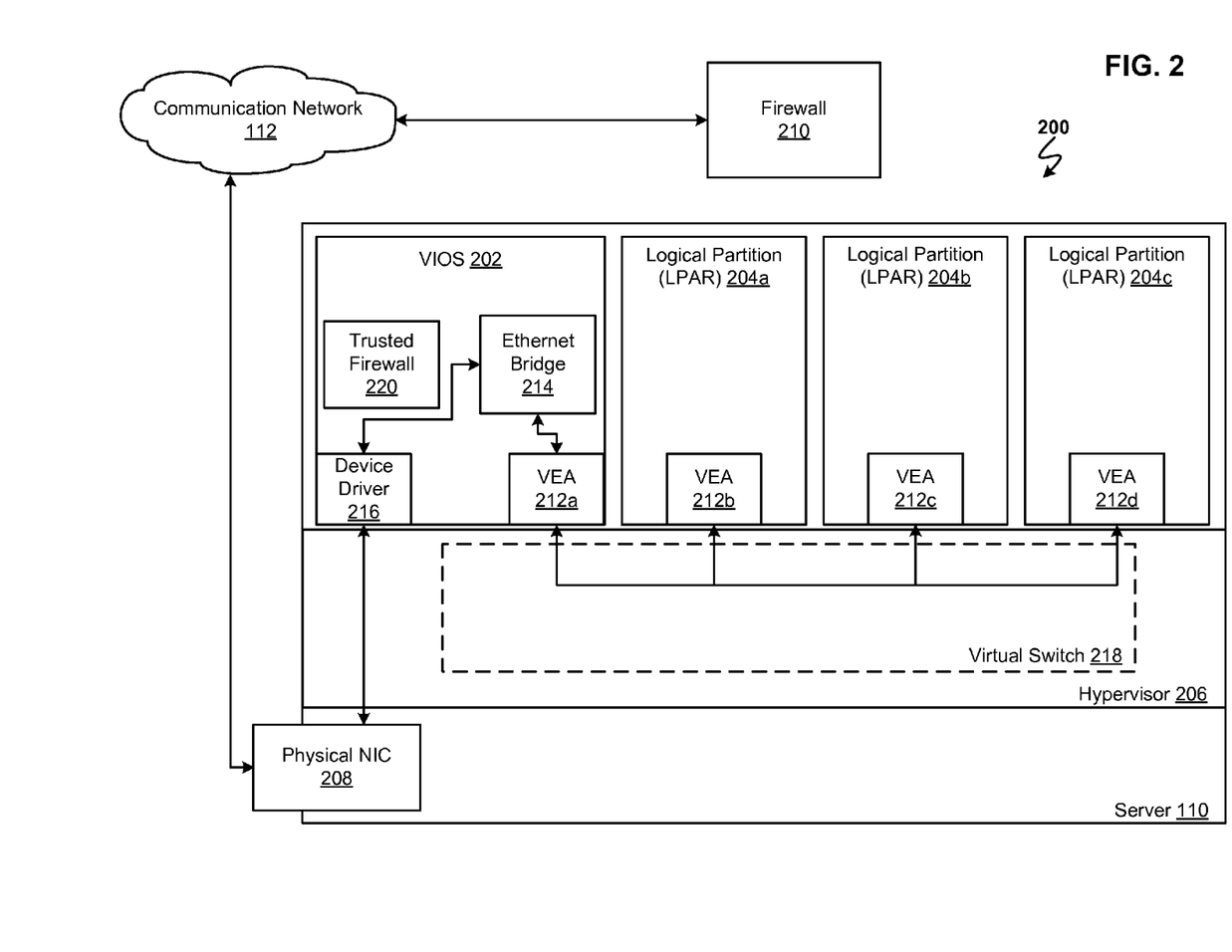
FIG. 2 is a block diagram of a virtual environment according to at least one embodiment.

Referring now to FIG. 2, a block diagram of a virtual system 200 (i.e., virtual environment) according to at least one embodiment is depicted.

The virtual system 200 includes a server 110 containing a virtual I/O server (VIOS) 202, logical partitions (LPAR) 204a-c, a hypervisor 206, and a physical network interface controller (NIC) 208. External to the server 110 running the virtual environment 200 is a physical firewall 210 (i.e., Host Intrusion Prevention System (HIPS)) that is connected to the server 110 via a communications network 112.

The server 110 may configured with virtual Ethernet adapters (VEA) 212*a-d* for the physical NIC 208, VIOS 202 and LPARs 204*a-c*. As depicted, VEA 212*a* is assigned to the VIOS 202 and VEAs 212*b-d* are assigned to LPARs 204*a-c*. Additionally, the VEA 212*a* assigned to the VIOS 202 may access to the server's 110 Physical NIC 208 through an Ethernet bridge 214 that may use the device driver 216 to communicate to the physical NIC 208.

The LPARs 204*a-c* may communicate to each other and the VIOS 202 using the VEAs 212*a-d* assigned to the VIOS 202 and LPARs 204*a-c*. Virtual network communication between the LPARs 204*a-c* and the VIOS 202 may be managed by the hypervisor 206 using a virtual switch 218.

In some virtual environment 200 deployments, when two LPARs (e.g., 204*a* and 204*c*) communicate through a virtual network connection, a packet from the originating LPAR (e.g., 204*a*) may be sent out the LPAR's (e.g., 204*a*) VEA (e.g., 212*b*) to the virtual switch 218 in the hypervisor 206 that delivers the packet to the VEA (e.g., 212*a*) of the VIOS 202. The VIOS 202 then sends the packet through the Ethernet bridge 214 and device driver 216 to the physical NIC 208 where the packet is sent through the communication network 112 to the firewall 210. After the firewall 210 processes the packet (e.g., search packet payload for malware) or bypasses the packet (e.g., finds a match for the packet connection information in the trusted connection table stored in the firewall and sends the packet to the packet's destination), the packet may be sent back through the communication network 112 to the physical NIC 208 attached to the server 110. The packet may return to the VIOS 202 from the physical NIC 208 through the device driver 216 to the Ethernet bridge 214. Finally, the VIOS 202 may send the packet trough a VEA (e.g., 212*a*) to the virtual switch 218 in the hypervisor 206 that delivers the packet to the target LPAR (e.g., 204*c*) through the target LPAR's (e.g., 204*c*) VEA (e.g., 212*d*).

According to at least one embodiment, a virtual component, such as a trusted firewall 220, may be added to the VIOS 202 to more efficiently handle communications between LPARs 204*a-c* within the same physical entity (e.g., server 110). According to at least one other embodiment, the virtual component may be added to the hypervisor 206. Network traffic that would otherwise need to be sent out to the firewall 210, may, in some instances, be managed within virtual environment 200 using the trusted firewall 220 (i.e., virtual component). The trusted firewall 220 may dynamically apply bypass rules based on algorithms commonly used in the physical firewall 210 within the virtual environment 200. For example, the trusted firewall 220 may receive a copy of the trusted connection table from the firewall 210 so the trusted firewall 220 may be able to handle a packet the same way the firewall 210 would handle a packet. The trusted firewall's 220 trusted connection table may be updated to match the firewall's 210 trusted table connection as the trusted firewall table in the firewall 210 is updated, in order to maintain table equivalence.

The virtual switch 218 may search a routing table (e.g., stored as a data structure such as a database 114 (FIG. 1) accessible by the virtual switch 218) associated with the virtual switch 218 to determine if the destination of a packet that is being sent from one LPAR (e.g., 204*a*) is to another LPAR (e.g., 204*c*) within the same virtual environment 200. If the packet is determined to be an inter-LPAR packet (i.e., a packet sent between two LPARs 204*a-c* within the same virtual environment 200) the trusted firewall 220 may be utilized to perform some security operations (e.g., packet bypass) without wasting resources to send the packet out to the firewall 210. The trusted firewall 220 may be configured with a trusted connection table to handle packet bypass within the virtual environment 200 in the same way that the external firewall 210 would, without the performance impact incurred from sending the packet out to the firewall 210. The trusted firewall 220 may receive SNMPv3, NETCONF, or other trusted messages from the firewall 210 to configure the trusted firewall 220 to handle packet bypass according to the rules that the firewall 210 uses. For example, the trusted firewall 220 may receive a copy of the trusted connection table from the external firewall 210 via a SNMPv3 message. Once configured, the trusted firewall 220 may then handle packet bypass situations within the virtual environment 200 in the same way that the external firewall 210 would bypass packets from trusted connections.

For example, source LPAR 204*a* sends out a packet that has a destination of LPAR 204*c*. The virtual switch 218 in the hypervisor 206 will receive the packet from LPAR's 204*a* VEA 212*b*. The virtual switch 218 will look up in the routing table associated with the virtual switch 218 to determine the packet's destination. The virtual switch 218 will determine that the packet's destination is to LPAR 204*c* that is within the same virtual environment 200. Based on the virtual switch's 218 determination that the packet is an inter-LPAR packet, the virtual switch 218 will forward the packet to the VIOS 202 to pass through the trusted firewall 220. The virtual switch 218 then forwards the packet to the VIOS 202 through VEA 212*a*. The VIOS 202 will then forward the packet to the trusted firewall 220. Once the trusted firewall 220 has the packet, the trusted firewall will identify the packet's connection information (e.g., source IP address, destination IP address, source port, destination port, protocol, etc.) and search the trusted firewall's 220 trusted connection table for an entry that matches the packet's connection information. The trusted connection table may contain entries that store data corresponding to a trusted connection, such as a trusted source IP address, a trusted destination IP address, a trusted source port, a trusted destination port and a trusted port. If the trusted firewall 220 matches the source IP address, destination IP address, source port, destination port and protocol associated with the packet to a trusted source IP address, a trusted destination IP address, a trusted source port, a trusted destination port and a trusted port contained in an entry associated with a trusted connection.

If the packet's connection information matches an entry in the trusted firewall's 220 trusted connection table, the packet will then be sent out VEA 212*a* to the virtual switch 218. The virtual switch 218 will then forward the packet to the destination LPAR 204*c* through the LPAR's 204*c* VEA 212*d*.

However, if the packet's connection information is not found in the trusted connection table stored in the trusted firewall 220, the packet is sent out the external firewall 210 as described above. The firewall 210 then determines if the packet is harmful (e.g., contains malware) by examining the packet's payload (i.e., data the packet is containing). If the packet is harmful, the firewall 210 will drop the packet. However, if the packet is determined to be safe, the packet is sent back to the destination LPAR 204*c* in the virtual environment 200 as described above. Additionally, if the firewall 210 determines that the packet is safe, the firewall 210 may determine if the connection associated with the packet should be added to the trusted connection table based on factors such as connection time or other connection policy.

Figure 3:
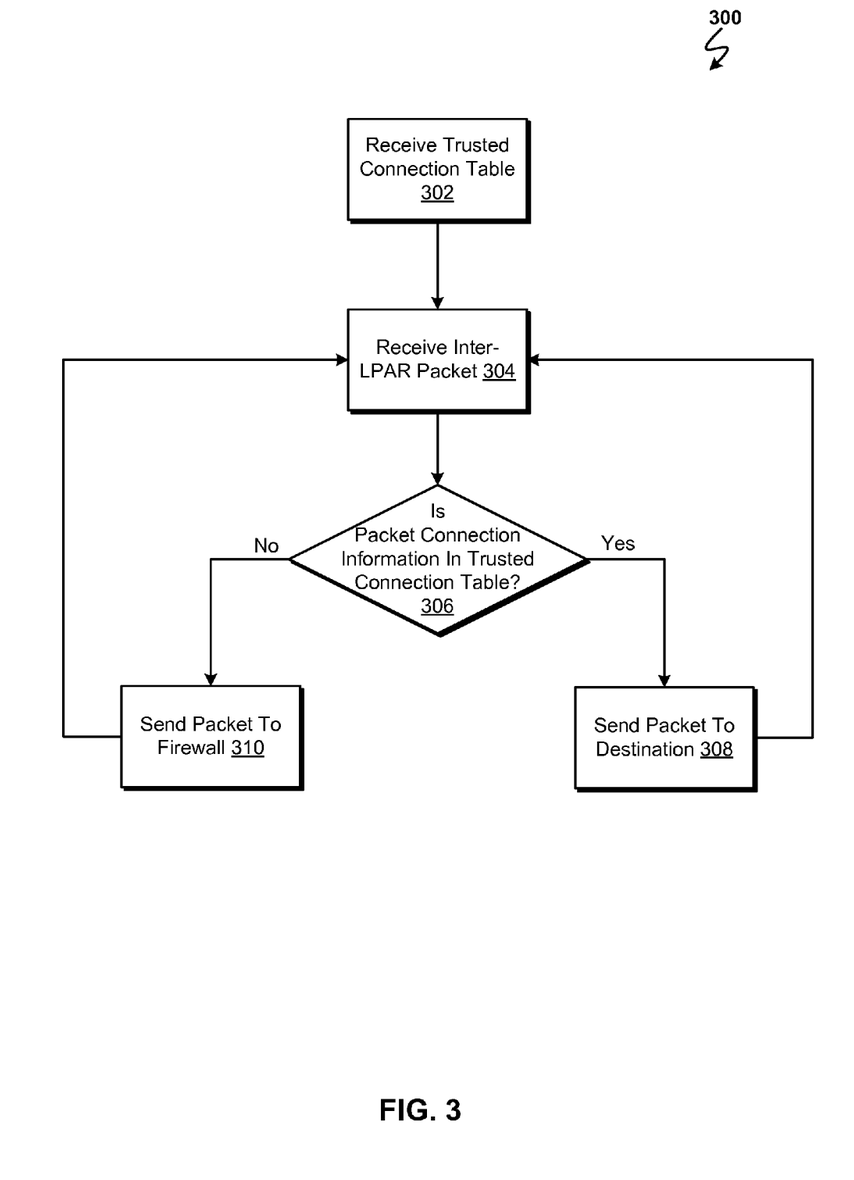
FIG. 3 is an operational flow chart illustrating a process for a virtual firewall load balancer according to at least one embodiment.

Referring now to FIG. 3, an operational flow chart illustrating the steps 300 carried out by the virtual firewall balancer program 108a and 108b (FIG. 1) (e.g., a trusted firewall 220 (FIG. 2)) according to at least one embodiment is depicted.

At 302 a trusted connection table may be received by the trusted firewall 220 (FIG. 2) (i.e., virtual component) running on the VIOS 202 (FIG. 2) from the external firewall 210 (FIG. 2). According to at least one embodiment, firewall 210 (FIG. 2) or HIPS, may send the trusted connection table that the firewall 210 (FIG. 2) uses via trusted messages (e.g., SNMPv3, NETCONF, etc.) to the trusted firewall 220 (FIG. 2). The trusted firewall 220 (FIG. 2) may then store the received trusted connection table in a data structure, such as a database 114 (FIG. 1) accessible by the trusted firewall 220 (FIG. 2).

Next, at 304, the trusted firewall 220 (FIG. 2) may receive an inter-LPAR packet from the virtual switch 218 (FIG. 2) as described above.

Then, at 306, it may be determined if the connection information associated with the packet that arrived from the virtual switch 218 (FIG. 2) at 304 is found in the trusted connection table. According to at least one embodiment, connection information associated with the transmitted packet may contain data indicating the packet's source IP address, destination IP address, source socket, destination socket and protocol. The trusted connection table may be searched by the trusted firewall 220 (FIG. 2) to find connection information matching the packet's connection information.

If it was determined that the packet that the packet's connection information matches an entry within the trusted connection table at 306, the packet may be forwarded to the virtual switch 218 (FIG. 2) for delivery to the destination LPAR (e.g., 204c (FIG. 2)) at 308. The trusted firewall 220 (FIG. 2) may then return to 304 to wait for another inter-LPAR packet.

However, if it was determined that the packet's connection information does not match an entry within the trusted connection table at 306, the trusted firewall 220 (FIG. 2) may then forward the packet to the firewall 210 (FIG. 2) at 310. As described above, the firewall 210 (FIG. 2) may then examine the packet for harmful payload (e.g., malware). If the firewall 210 (FIG. 2) determines that the packet is safe, the packet may be forwarded back to the VIOS 202 (FIG. 2) for delivery to the target LPAR (e.g., 204c (FIG. 2)). However, if the firewall 210 (FIG. 2) determines that the packet is not safe, the packet may be dropped. The trusted firewall 220 (FIG. 2) may then return to 304 to wait for another inter-LPAR packet.

It may be appreciated that FIGS. 2 and 3 provide only an illustration of one embodiment and does not imply any limitations with regard to how different embodiments may be implemented. Many modifications to the depicted embodiment(s) may be made based on design and implementation requirements.

Figure 4:
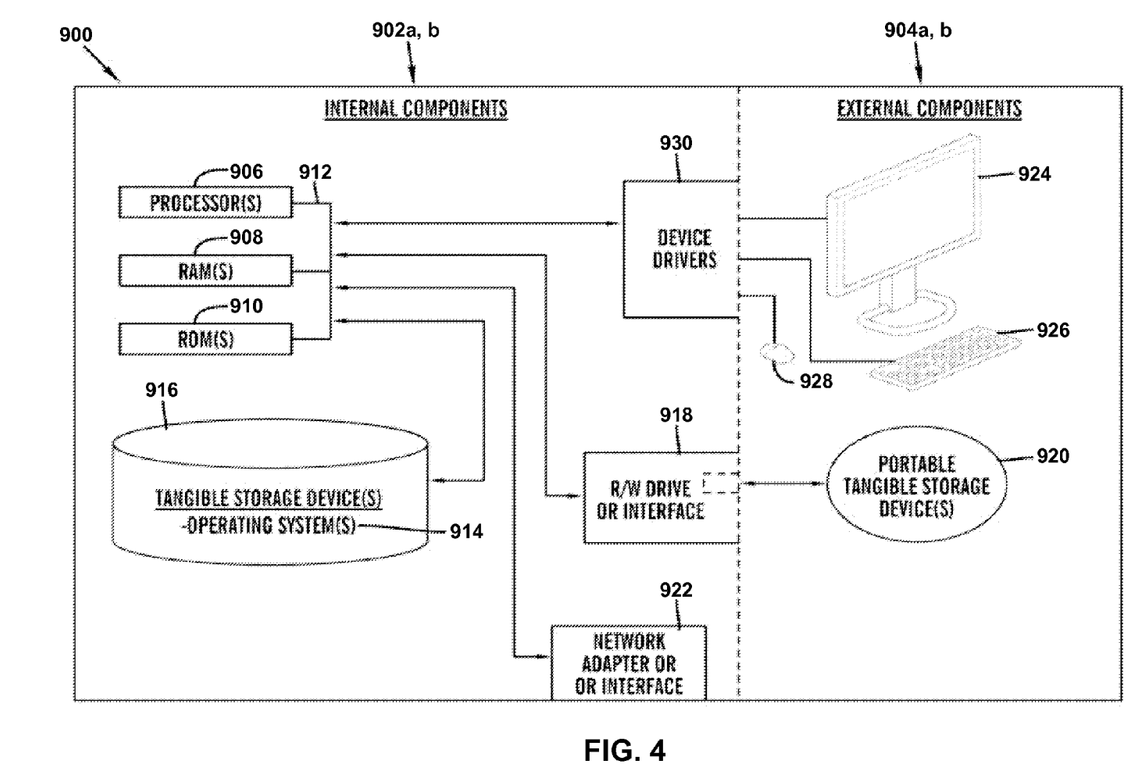
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 110 (FIG. 1) may include respective sets of internal components 902 a, b and external components 904 a, b illustrated in FIG. 4. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914 and programs such as a virtual firewall balancer program 108a and 108b (FIG. 1), may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. The virtual firewall balancer program 108a and 108b (FIG. 1) can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The virtual firewall balancer program 108a (FIG. 1) in client computer 102 (FIG. 1) and the virtual firewall balancer program 108b (FIG. 1) in network server computer 110 (FIG. 1) can be downloaded from an external computer (e.g., server) via a network (for example, the Internet, a local area network or other, wide area network) and respective network adapters or interfaces 922. From the network adapters (or switch port adaptors) or interfaces 922, the virtual firewall balancer program 108a (FIG. 1) in client computer 102 (FIG. 1) and the virtual firewall balancer program 108b (FIG. 1) in network server computer 110 (FIG. 1) are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
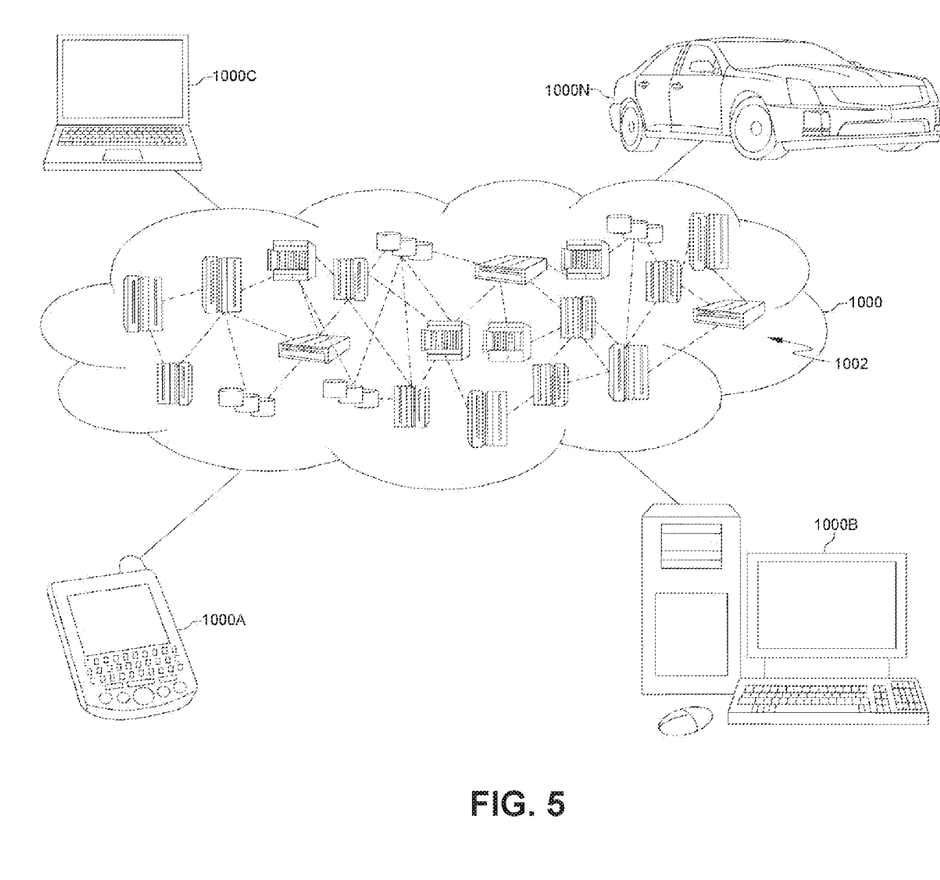
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 1002 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 1002 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 1002 and cloud computing environment 1000 can communicate with any type of computerized device over any type of network and/or network addressable connection (e.g., using a web browser).

Figure 6:
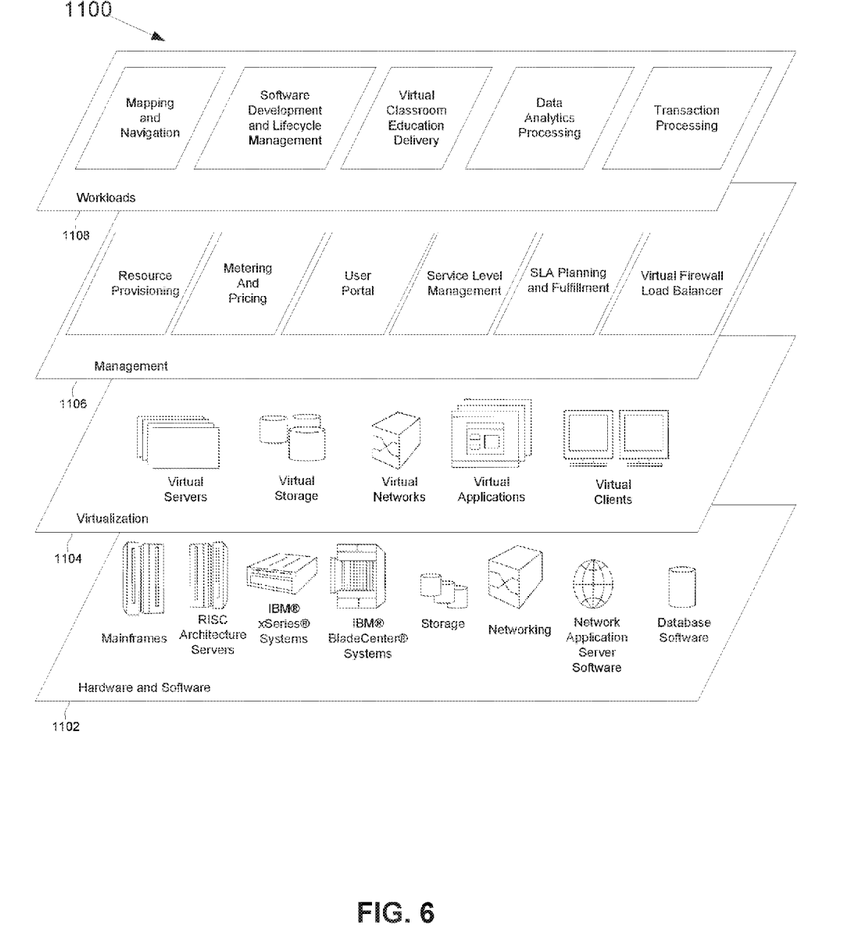
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes; RISC (Reduced Instruction Set Computer) architecture based servers; storage devices; networks and networking components. In some embodiments, software components include network application server software.

Virtualization layer 1104 provides an abstraction layer from which the following examples of virtual entities may be provided: virtual servers; virtual storage; virtual networks, including virtual private networks; virtual applications and operating systems; and virtual clients.

In one example, management layer 1106 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A virtual firewall load balancer provides firewall bypass rule implementation within a virtual system.

Workloads layer 1108 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for load balancing between a virtual component within a virtual environment and a Host Intrusion Prevention System (HIPS), comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
receiving a trusted connection table from the HIPS, wherein the trusted connection table contains a plurality of trusted connection information;
receiving a network packet from a virtual switch, wherein the network packet has a plurality of connection information;
determining if the plurality of connection information matches the plurality of trusted connection information;
sending the network packet to a destination based on determining that the plurality of connection information matches the plurality of trusted connection information; and
sending the network packet to the HIPS based on determining that the plurality of connection information does not match the plurality of trusted connection information.

2. The computer system of claim 1, wherein the virtual environment comprises a virtual input output server (VIOS), a hypervisor and a plurality of virtual Ethernet adapters.

3. The computer system of claim 2, wherein the virtual component is a trusted firewall running within the VIOS or the trusted firewall running within the hypervisor.

4. The computer system of claim 1, wherein receiving the trusted connection table from the HIPS comprises the virtual component within the virtual environment receiving a trusted message containing the trusted connection table from the HIPS.

5. The computer system of claim 4, wherein the trusted message comprises sending a plurality of data according to at least one of a Simple Network Management Protocol version 3 (SNMPv3) and a Network Configuration Protocol (NETCONF).

6. The computer system of claim 1, wherein the HIPS comprises a physical firewall connected to the virtual environment by a communication network.

7. The computer system of claim 1, wherein the plurality of connection information comprises a source Internet Protocol (IP) address, a destination IP address, a source port, a destination port, and a protocol.

8. The computer system of claim 7, wherein the plurality of trusted connection information comprises a trusted source IP address, a trusted destination IP address, a trusted source port, a trusted destination port, and a trusted protocol.

9. The computer system of claim 8, wherein determining if the plurality of connection information matches the plurality of trusted connection information comprises matching the source IP with the trusted source IP address, matching the destination IP address to the trusted destination IP address, matching the source port to the trusted destination port, matching the destination port to the trusted destination port, and matching the protocol with the trusted protocol.

10. A computer program product for load balancing between a virtual component within a virtual environment and a Host Intrusion Prevention System (HIPS), comprising:
one or more non-transitory computer-readable storage medium and program instructions stored on at least one of the one or more non-transitory computer-readable storage medium, the program instructions executable by a processor, the program instructions comprising:
program instructions to receive a trusted connection table from the HIPS, wherein the trusted connection table contains a plurality of trusted connection information;

program instructions to receive a network packet from a virtual switch, wherein the network packet has a plurality of connection information;

program instructions to determine if the plurality of connection information matches the plurality of trusted connection information;

program instructions to send the network packet to a destination based on determining that the plurality of connection information matches the plurality of trusted connection information; and program instructions to send the network packet to the HIPS based on determining that the plurality of connection information does not match the plurality of trusted connection information.

11. The computer program product of claim 10, wherein the virtual environment comprises a virtual input output server (VIOS), a hypervisor and a plurality of virtual Ethernet adapters.

* * * * *